United States Patent Office 3,117,152
Patented Jan. 7, 1964

3,117,152
SUBSTANTIALLY NEUTRAL MAGNESIUM SALT OF A PHOSPHORIC ACID ESTER OF OXETHYL-ATED NONYL PHENOL
Edwin B. Michaels, Stamford, Conn., assignor to Stamford Chemical Industries, Inc., Stamford, Conn., a corporation of Delaware
No Drawing. Original application May 10, 1960, Ser. No. 28,021. Divided and this application Nov. 6, 1961, Ser. No. 150,146
1 Claim. (Cl. 260—461)

The present invention relates to novel magnesium salts of mono- and di-phosphate esters of oxyethylated higher alkyl phenols or of oxyethylated higher aliphatic monohydric alcohols and methods for their preparation. More particularly, it relates to such novel magnesium salts of mono- and di-phosphate esters of enhanced detergency in an organic drycleaning solvent and compositions containing the same.

It is considered good practice in the drycleaning industry to add small amounts of a detergent to an organic solvent to effect efficient removal of sweet stains and soil and to reduce graying of a soiled garment or fabric. Unfortunately, widely used detergents such as the cationics, anionics and non-ionics are not wholly satisfactory, since many exhibit relatively low levels of both sweet stain and soil removal as well as the avoidance of "graying" or soil redeposition. A pressing need for a detergent which provides for high levels of stain and soil removal as well as whiteness retention exists. A detergent which possesses these properties if one could be found, would be highly desirable.

It is, therefore, a principal object of the present invention to provide novel detergent compounds capable of being dissolved in organic solvents. It is a further object to provide novel organic solvent soluble phosphoric acid ester detergents which are capable of enhancing soil and sweet stain removal while increasing whiteness retention in drycleaning operations. Other objects and advantages will become clear from a reading of the ensuing description.

To this end, a magnesium salt of either oxyethylated higher alkyl phenol phosphoric acid esters or oxyethylated higher aliphatic alcohol phosphoric acid esters has been provided which, when incorporated in a drycleaning solvent, markedly affects the drycleaning operation. The class of detergents as included within the purview of the present invention are: the magnesium salts of oxyethylated higher alkyl phenol phosphoric acid mono- and di-esters as well as the oxyethylated higher aliphatic alcohol mono- and di-phosphoric acid esters.

It has been found that, according to the process of the invention, the magnesium salts of the phosphoric acid mono- and di-esters of oxyethylated higher alkyl phenols or aliphatic monohydric alcohols can be prepared and incorporated in a drycleaning solvent. For example, either the oxide or hydroxide of magnesium is reacted with phosphoric acid esters of either oxyethylated alkylphenols or oxyethylated higher aliphatic alcohols. Such esters are prepared initially by reacting either oxyethylated phenols or oxyethylated higher aliphatic alcohols with phosphorous pentoxide to obtain a mixture of mono- and di-phosphoric acid esters.

The preparation of the phosphoric acid esters contemplated by the present invention is accomplished in a straight-forward manner. In general, about one mol of either a higher alkyl phenol or a higher aliphatic monohydric alcohol is reacted with from about one to about fifteen mols of ethylene oxide. It is a good practice, however, to react of from about 3.5 to about 8.5 mols of ethylene oxide per mol of higher alkyl phenol or higher aliphatic alcohol. Mixtures of such oxyethylated phenols or alcohols are also contemplated. Thus, for example, a substantially mono-oxyethylated phenol, prepared by reacting nonyl phenol with one mol of ethylene oxide, can be admixed in equal proportions with a polyoxyethylated phenol, such as nonyl phenol reacted with about twelve mols of ethylene oxide. Such mixtures have been found to possess exceptional emulsifying as well as detergent properties when incorporated in a drycleaning solvent.

Among the higher alkyl phenols or higher aliphatic monohydric alcohols included are for example: p-octyl phenol, p-nonyl phenol, p,o-dinonyl phenol, tridecyl phenol, octyl alcohol, decyl alcohol, lauryl alcohol and tridecyl alcohol. Since the octyl- and nonyl-phenols are readily commercially available, they constitute a preferred embodiment.

Resultant oxyethylated higher alkyl phenols or oxyethylated higher aliphatic monohydric alcohols are next reacted with phosphorous pentoxide at temperatures between about 70° C. and about 140° C., and preferably from 85° C. to 105° C., for from about 5 to 250 hours or more, in any suitable closed reaction vessel. Usually, molar quantities of from about two and one-half to five mols, and preferably from 3.5 to 4.5 mols, of the phenol or alcohol reactant per mol of phosphorous pentoxide are sufficient to effect the desired reaction.

The aforementioned reaction results in a mixture of mono- and di-phosphoric acid esters. Esters of complex phosphoric acids which may also be formed can be hydrolyzed to the phosphate esters and to insure that a mol ratio of di-esters to mono-esters in said ester mixture be present in the range of from 1 to 1 or greater, respectively. Though the mono ester can be separated from the di ester, it has been found that a mixture of di- and mono-ester is highly useful as the detergent in admixture with the dry-cleaning solvent. It has been further found that the mol ratio range of di-ester to mono-ester will widely vary from about 1:0.5 to 1:20 or greater, and preferably from 1:1 to 1:6 respectively, as determined by electrometric titration at a glass electrode. In general, a phosphate ester is titrated in an aqueous medium with standard alkali. Two endpoints are obtained. The first endpoint, termed ($H_1$), reflects the hydrogen ion of the di-ester and the first hydrogen ion of the mono-ester. The second endpoint, termed ($H_2$), reflects the second hydrogen ion of the mono-ester.

The ratio can be expressed as follows:

$$\frac{\text{Mols of di-ester}}{\text{Mols of mono-ester}} = \frac{b-a}{2a-b}$$

in which $a$=total number cc. alkali to attain an endpoint or pH of $H_1$ (pH usually 3–6), and
$b$=total number cc. alkali to an attain endpoint or pH of $H_2$ (pH usually 8–9).

Variations in the mol ratio of di- to mono-esters prior to reaction with a magnesium base is, for instance, dependent upon the phosphorous pentoxide to phenol or alcohol mol reaction ratio. Additionally, time and temperature are factors which may affect the mol ester ratio. Thus, for instance, where the mol ratio of the alcohol or phenol reactant to phosphorous pentoxide is low, say in the mol ratio of 3:1, respectively, or where the mol ratio is about 4:1, but the time employed during the reaction is excessively long, say 14 days or more, or where temperatures are excessively high, say in excess 140° C., polymeric complex phosphoric acid esters, such as esters of pyrophosphoric acid, are formed. Under the latter reaction conditions the mol ratio of di-ester to mono-ester of resultant phosphate ester is less than 1:1, and about 1:0.5. When magnesium salts of such polymeric complex phosphoric acid ester are prepared, the detergency values with respect to whiteness retention and soil removal markedly decrease.

Notwithstanding polymeric complex phosphoric acid ester formation, such complex can be converted unexpectedly to useful phosphate esters of enhanced detergency by hydrolyzing the polymeric complex prior to magnesium salt formation. The hydrolysis is accomplished by adding from 5% to 10% or more water based on the weight of the polymeric complex, and heating the mixture to from about 85° C. to 120° C. for from about one to about twenty-four hours. When hydrolysis is effected, and for good practice should be effected if the acid number of a sample of hydrolyzed ester increases 1% or more, pH titration measurements are taken to determine the mol ratio of resultant esters. It is found that the mol ratio of di-ester to mono-ester is increased from less than 1:1 to 1 to 1–2, respectively. However, when both the phenol-ethylene oxide condensate is highly hydrophobic and the condensate to phosphorous pentoxide mol ratio is high, say in the ratio of 2.7 to 1, resultant di-ester to mono-ester ratio found is 1–20 or higher, respectively.

In accordance with the practice of the invention, a magnesium base, such as magnesium oxide or magnesium hydroxide, and the aforementioned phosphoric acid ester are admixed in an aqueous medium and preferably in an aqueous alcoholic medium. The latter mixture is agitated for from about one-half hour to two hours. The pH of the reaction mixture is intermittently tested. For instance, when a pH of 6.5 to about 8 is obtained, the reaction is then deemed to be completed and the reaction solvent removed to recover resultant magnesium salt. The latter is next oven dried at about 88° C.–99° C. It can then be incorporated into a drycleaning solvent.

Any commercially available drycleaning solvent is within the purview of the instant invention. Illustrative solvents are: Stoddard solvent, perchlorethylene, trichloroethylene and carbon tetrachloride. A good practice is to add the magnesium salts described above to any one of the drycleaning solvents in amounts ranging from about 0.2% to about 4% of said salt based upon the weight of the solvent.

Advantageously, drycleaning solvents containing the magnesium salts of the present invention are capable of efficiently cleaning garments, textiles, fabrics and the like so as to leave them substantially free from sweet stains and soil as well as demonstrating a marked decrease toward greying of such materials. Garments thus cleaned have an excellent "hand" and are free from harshness generally found in the usual drycleaning practice. Further, such garments when subjected to tumbling to dry the same after cleaning do not produce linting. Unexpectedly, even where the relative humidity is low, static electricity usually experienced while tumbling garments is not built up. It is postulated, without being limited thereto, that this beneficial effect may be due to the adsorption of the magnesium salts in minute quantity during the cleaning process.

In order to facilitate an understanding of the invention, the following examples are given as merely illustrative of the best practices and not as limitative thereof. The parts given are by weight unless otherwise stated.

EXAMPLE 1

Into a suitable pressure vessel is added one mol of phosphorous pentoxide and four mols of polyoxyethylated nonylphenol containing an average of 5.5 oxyethyl groups. The vessel is next sealed and heated to about 99° C. for 168 hours. Heating is discontinued, the reaction vessel opened and the contents therein are slowly cooled to room temperature and removed from the reaction vessel.

A small amount of the reaction product is analyzed to determine the type of ester present. It is found that the acid number of reaction product is 81.8 and consists of di- and mono-esters in a mol ratio of 1 to 1.5 respectively.

1000 parts of the esters so prepared (one mol) and 30 parts of magnesium oxide (0.75 mol) are stirred in a suitable vessel containing 40 parts of water, 80 parts methyl amyl alcohol for about one hour. The pH of the resultant paste, when diluted with water for testing, is 7.0. A clear opalescent paste, dispersible in water and soluble in perchlorethylene and Stoddard solvent is obtained.

EXAMPLE 2

Example 1 is repeated in every material respect, except that polyoxyethylated octyl phenol containing an average of 4.5 oxyethylated groups is substituted for the polyoxyethylated nonyl phenol reactant. On titration, the mol ratio of di-ester to mono-ester in the ester composition is 1 to 1.1 and the acid number is 100.8.

The magnesium salt of phosphoric acid ester is prepared as in the preceding example. Resultant salt is characterized as being relatively insoluble in water and more efficient in emulsifying petroleum solvents than the higher ethoxylated salt of Example 1, above.

EXAMPLE 3

Example 1 is repeated in every material respect except that polyoxyethylated tridecyl phenol containing an average of 7.5 oxyethyl groups is substituted for the aforementioned polyoxyethylated nonylphenol reactant. On titration the mol ratio of di-ester to mono-ester is 1:1.2. The acid number of the latter composition is 75.0.

The magnesium salt of phosphoric acid ester is prepared as in the foregoing Example 1 except magnesium hydroxide is substituted for the magnesium oxide of said example. The salt is characterized as: a paste soluble in kerosene, in kerosene type fuels and motor lube oils. It shows excellent dispersing power for carbon in these media.

EXAMPLE 4

Repeating Example 1 in every detail except that polyoxyethylated nonyl phenol containing an average of 12.4 oxyethyl groups is substituted for the polyoxyethylated nonyl phenol reactant set forth therein. The mol ratio of di- to mono-ester in the ester composition is 1 to 1 and the acid number is 47.04.

The magnesium salt of phosphoric acid ester is next prepared as in Example 1 and the resultant salt is characterized as being soluble in perchlorethylene and in water, but not soluble in kerosene.

EXAMPLE 5

Example 1 is repeated in every material detail except that the polyoxyethylated nonyl phenol containing an average of 1.1 oxyethyl groups is substituted for the polyoxyethylated nonyl phenol reactant as set forth therein. The di- to mono-ester mol ratio in the phosphate ester composition is 1 to 1.3 and the acid number is 121.0.

The magnesium salt is next prepared as in Example 1 and resultant salt is soluble in kerosene and insoluble in water. The magnesium salt is a hard waxy solid.

EXAMPLE 6

Equal parts of the magnesium salts of polyoxyethylated nonyl phenol as prepared in Examples 4 and 5 are admixed and about 5% of the mixture is incorporated in a perchlorethylene drycleaning solvent containing 10% moisture.

The salt mixture demonstrates marked activity as an emulsifier in the latter drycleaning solvent system. It is noted that separation of the water phase and organic solvent phase does not take place.

EXAMPLE 7

To 100 parts of tridecyl alcohol ethylene oxide condensate (0.146 mol), prepared by reacting 1 mol of the alcohol with seven mols of ethylene oxide, is added, in a suitable reaction vessel, 5.2 parts of phosphorous pentoxide (0.037 mols) while stirring at a temperature of from about 50° C. to about 55° C., until all the phosphorous pentoxide is dissolved therein. The temperature is next increased to about 96° C. and heated for a period of 170 hours. On titration the di- to mono-ester mol ratio of the ester composition is 1 to 1.8 and the acid number is 96.3.

Resultant reaction product is cooled to room temperature and to the clear viscous liquid is added a mixture of 8 parts (by volume) of methyl amyl alcohol and 4 parts of water.

To the aforementioned mixture is next added three and one-half parts of lightly precipitated magnesium oxide and the mixture vigorously stirred. A pH of 6.7 is noted in testing an aqueous dispersion. A clear opalescent paste, dispersible in water and soluble in Stoddard solvent is obtained.

EXAMPLE 8

4.5 mols of polyoxyethylated nonyl phenol containing an average of 4.5 oxyethylated groups is added 1 mol of phosphorous pentoxide to a suitable reaction vessel which can be closed, heating the closed reaction for fourteen days and at a temperature of about 99° C. On titration of the mixture, the di- to mono- ester mol ratio of the ester composition is 1 to 1.3. The composition is found to possess an acid number of 85.2.

The composition is next reacted with sufficient magnesium oxide to form a magnesium salt of pH—7.

Though the mol ratio of di- to mono- ester is 1 to 1.3, nonetheless the drastic heating condition for the prolonged period results in an inferior product of poor detergency.

EXAMPLE 9

50 parts of ester product of claim 8, prior to magnesium oxide neutralization, is hydrolyzed with 5 parts of water in a closed reaction vessel at about 88° C. for 24 hours. The resultant ester composition shows a mol ratio of di-ester to mono-ester as determined by titration to be 1 to 1.5, respectively, having an acid number equal to 103.0.

The hydrolyzed ester product is next neutralized with magnesium oxide to a pH equal to 7. This product demonstrates better than average detergency.

EXAMPLE 10

To demonstrate that the above exemplified salts are valuable detergent adjuvants in dry cleaning solvents, each of the salts is tested in the following manner:

In accordance with the procedure set forth in the Technical Manual of the American Association of Textile Chemists and Colorist at page 90, 1959 edition, pint jars are charged with 100 ml. of perchlorethylene solvent containing 0.7% of the compound to be tested. Twenty stainless steel balls are added to each jar with the test fabric swatches. These fabric swatches are both cotton and wool which have been previously soiled by printing or immersion in a greasy carbon soil. There is provided in each jar both soiled and unsoiled swatch samples of cotton and wool. The jars are then sealed and tumbled in an Atlas Launderometer for twenty minutes. The swatches are removed, extracted and dried.

Reflectance values of the dried swatches as measured with a surface reflectomer are obtained. To determine the numerical values both of the percent loss of brightness of the unsoiled swatches and the percent increase in brightness of the soiled swatches, the reflectance values of the dried swatches to obtained are compared to the reflectance readings, prior to drycleaning of unsoiled and soiled swatches. The latter readings are based on scale of 100 and 29, respectively. The results are tabularized below.

*Table 1*

| Compound | $C_w$* | $W_w$* | $C_d^+$ | $W_d^+$ |
|---|---|---|---|---|
| Ex. 1 | 0.2 | 0.0 | 24.0 | 35.0 |
| Ex. 2 | 0.8 | 0.0 | 26.0 | 37.0 |
| Ex. 3 | 0.0 | 0.5 | 26.0 | 36.0 |
| Ex. 4 | 6.0 | 15.0 | 19.0 | 33.0 |
| Ex. 5 | 20.0 | 22.0 | 15.0 | 21.0 |
| Ex. 6 | 2.0 | 3.0 | 24.0 | 35.0 |
| Ex. 7 | 1.0 | 2.5 | 28.0 | 34.0 |
| Ex. 8 | 20.0 | 30.0 | 14.0 | 21.0 |
| Ex. 9 | 1.5 | 4.0 | 27.0 | 35.0 |

*$C_w$ (Cotton redeposition index) $= \dfrac{A-B}{A}$

Where:
A = Original reflectance of unsoiled cotton, and
B = Reflectance unsoiled cotton after cleaning.

*$W_w$ (Wool redeposition index) $= \dfrac{C-D}{C}$

Where:
C = Original reflectance unsoiled wool, and
D = Reflectance unsoiled wool after cleaning.

+$C_d$ (Cotton cleaning index) $= F-E$

Where:
E = Reflectance of soiled cotton, and
F = Reflectance of soiled cotton after cleaning.

+$W_d$ (Wool cleaning index) $= H-G$

Where:
G = Reflectance of soiled wool, and
H = Reflectance of soiled wool after cleaning.

The above values illustrate the effect of each of the phosphate esters on whiteness retention and detergency values. It will be seen that the degree of ethoxylation affects both detergency and graying. In general, the lower the degree of ethoxylation as in Example 5, the poorer the over-all results. However, the upper limit of ethoxylation is limited by the decreasing solubility in organic solvents. This is influenced by the length of the alkyl chain and by the amount of $P_2O_5$ reacting with the condensate.

EXAMPLE 11

To illustrate the criticality of both pH and the use of magnesium salts of the organic phosphate esters prepared in accordance with the practice of the invention, several salts of the phosphate ester of Example 1 are prepared by reacting the phosphate ester with (a) alkali metal hydroxides, (b) alkaline earth metal hydroxide as well as (c) magnesium oxide, employing varying quanties to obtain corresponding salts of varying pH. The sodium, potassium, lithium, calcium and magnesium salts of the ester of Example 1 are readily prepared. The latter are tested in an Atlas launderometer as outlined in Example 10 above. The results are tabularized below.

*Table 2*

| Salt of Phosphate Ester Compound of Example 1 | pH | Reflectance Readings | | | |
|---|---|---|---|---|---|
| | | Decrease From Original Unsoiled Swatches | | Increase on Cleaning Soiled Swatches | |
| | | Cotton ($C_w$)* | Wool ($W_w$)* | Cotton ($C_d$)+ | Wool ($W_d$)+ |
| Sodium | 7 | 32 | 11 | 20 | 37 |
| Potassium | 7 | 30 | 7 | 24 | 35 |
| Lithium | 7 | 29 | 2 | 20 | 36 |
| Calcium | 7 | 30 | 6 | 23 | 36 |
| Magnesium | 6.0 | 3.0 | 2 | 19 | 32 |
| Do | 6.5 | 1.2 | 1 | 25 | 36 |
| Do | 7.0 | 0.0 | 0.0 | 27 | 38 |
| Do | 7.5 | 0.0 | 0.0 | 29 | 38 |
| Do | 8.0 | 3 | 2 | 22 | 30 |
| Do | 9.0 | 12 | 4 | 26 | 33 |

NOTE.—The meanings of $C_w$*, $W_w$*, $C_d^+$, and $W_d^+$ are the same as in Example 10 above.

It will be noted that the magnesium salt of the ester is most useful when it has been neutralized to a pH value of from about 6.5 to about 8.0. Even at pH=7, the salts other than the magnesium salt are, in general, poor detergents.

EXAMPLE 12

The effect of variations of the mol ratio of ethoxylated phenol to phosphorous pentoxide is determined by varying the mol ratio. Results are tabulated below.

*Table 3*

| Mol Ratio [1]—Alkyl Phenol Condensate/ $P_2O_5$ | Reflectance Readings | | | |
|---|---|---|---|---|
| | Decrease From Original Unsoiled Swatches | | Increase on Cleaning Soiled Swatches | |
| | $C_w$ | $W_w$ | $C_d$ | $W_d$ |
| 5/1 | 12.0 | 10.0 | 21 | 35 |
| 4.5/1 | 1.5 | 1.0 | 27 | 35 |
| 4.0/1 | 0.8 | 0.0 | 26 | 37 |
| 3.5/1 | 1.0 | 1.5 | 25 | 35 |
| 3.0/1 | 1.0 | 0.5 | 30 | 36 |
| 2.5/1 | 18.0 | 7.0 | 18 | 27 |
| 2.0/1 | 13.0 | 12.0 | 16 | 25 |

[1] Ester is prepared by reacting the indicated mol quantity of oxyethylated phenol with one mol of phosphorous pentoxide by the process of Example 2.

NOTE.—The meanings of $C_w$, $W_w$, $C_d$, and $W_d$ are the same as given in Example 10 above.

It will be seen from the above tabulated data that the best detergency is obtained within the range of mol ratios of from 4.5 (phenol) to 1 ($P_2O_5$) to about 3.0 (phenol) to 1 ($P_2O_5$) as employed in the preparation of the phosphate esters.

It is an advantage of the present invention that the novel phosphate esters may be combined with other oil soluble detergents. Thus, for example, oil-soluble mahogany sulfonates can be admixed with varying amounts of phosphate ester as above defined to obtain enhanced detergency and whiteness retention in drycleaning operations.

While the oil-soluble novel compounds hereinabove defined have been incorporated in drycleaning solvents, it is also contemplated that they may also be incorporated in fuel oils, such as diesel oil, gasoline, as well as in motor oils.

This application is a division of my copending application, Serial No. 28,021, filed May 10, 1960.

I claim:

The substantially neutral magnesium salt of a phosphoric acid ester of oxyethylated nonyl phenol containing about 5.5 oxyethyl groups.

References Cited in the file of this patent

UNITED STATES PATENTS

| | | |
|---|---|---|
| 2,177,983 | Harris | Oct. 31, 1939 |
| 2,853,471 | Beadell | Sept. 23, 1958 |
| 3,004,056 | Nunn et al. | Oct. 10, 1961 |
| 3,004,057 | Nunn | Oct. 10, 1961 |
| 3,010,903 | Clarke et al. | Nov. 28, 1961 |